(12) United States Patent
Soliman et al.

(10) Patent No.: US 9,198,092 B2
(45) Date of Patent: Nov. 24, 2015

(54) PSC TRANSMISSION WITH TIME OFFSET FOR UNIQUE SMALL CELL IDENTIFICATION

(71) Applicant: QUALCOMM Incorporated, San Diego, CA (US)

(72) Inventors: Samir Salib Soliman, Poway, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 13/668,514

(22) Filed: Nov. 5, 2012

(65) Prior Publication Data

US 2014/0128079 A1    May 8, 2014

(51) Int. Cl.
| | |
|---|---|
| *H04W 36/08* | (2009.01) |
| *H04W 36/00* | (2009.01) |
| *H04W 36/04* | (2009.01) |
| *H04W 84/04* | (2009.01) |

(52) U.S. Cl.
CPC .......... *H04W 36/0055* (2013.01); *H04W 36/04* (2013.01); *H04W 84/045* (2013.01)

(58) Field of Classification Search
CPC ... H04W 84/045; H04W 24/10; H04W 36/04; H04W 8/26
USPC ..................... 455/418, 421, 433, 435.1, 435.2
See application file for complete search history.

(56) References Cited

U.S. PATENT DOCUMENTS

| | | | |
|---|---|---|---|
| 6,717,930 | B1 | 4/2004 | Sezgin et al. |
| 7,072,673 | B2 | 7/2006 | Tsunehara et al. |
| 7,603,124 | B2 | 10/2009 | Claussen et al. |
| 7,680,075 | B2 | 3/2010 | Ma et al. |
| 8,050,225 | B2 | 11/2011 | Luo |
| 2011/0019638 | A1 | 1/2011 | Hamel et al. |
| 2011/0310858 | A1 | 12/2011 | Tokgoz et al. |
| 2013/0203452 | A1* | 8/2013 | Awoniyi et al. ............... 455/500 |

FOREIGN PATENT DOCUMENTS

| | | |
|---|---|---|
| EP | 1983786 A1 | 10/2008 |
| EP | 2249603 A1 | 11/2010 |

OTHER PUBLICATIONS

International Search Report and Written Opinion—PCT/US2013/068559—ISA/EPO—Feb. 21, 2014.

(Continued)

*Primary Examiner* — Sam Bhattacharya
(74) *Attorney, Agent, or Firm* — Jeffrey D. Jacobs

(57) ABSTRACT

A method, an apparatus, and a computer program product for wireless communication are provided. The method and apparatus resolve issues related to voice and data handovers between micro cells, femto cells and other small cells, and to handovers from macro cells to small cells are becoming increasingly significant as small cells are more widely deployed. In order to handoff a call associated with a user equipment, a base station attempts to identify neighboring cells that are within communication range of the user equipment based on a primary scrambling code and delays between multiple transmissions of the PSC detected by the user equipment and reported to the base station by the user equipment.

66 Claims, 13 Drawing Sheets

(56) References Cited

OTHER PUBLICATIONS

Qualcomm Europe: "Considerations on enabling Active hand-in for legacy UEs", 3GPP Draft; R3-090842, 3rd Generation Partnership Project (3GPP), Mobile Competence Centre; 650, Route Des Lucioles; F-06921 S0phia-Antip0lis Cedex; France, no. Seoul, Korea; Mar. 19, 2009, pp. 1-4, XP050341218, [retrieved on Mar. 19, 2009] the whole document.

* cited by examiner

PSC TRANSMISSION WITH TIME OFFSET FOR UNIQUE SMALL CELL IDENTIFICATION

BACKGROUND

1. Field

The present disclosure relates generally to communication systems, and more particularly, to user equipment handover from macro cells to small cells and between small cells in a wireless network.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. Examples of telecommunication standards include Wideband CDMA (WCDMA), CDMA2000, Long Term Evolution (LTE) and Universal Mobile Telecommunications System (UMTS). Organizations that promulgate standards include the Third Generation Partnership Project (3GPP). For capacity gains, small cells are being deployed extensively. As the density of small cells increases, it becomes more difficult to uniquely identify and distinguish small cells and improved methods that enable unique identification of small cells are required.

SUMMARY

In an aspect of the disclosure, a method, a computer program product, and an apparatus are provided. The method and apparatus resolve issues related to voice and data handovers between micro cells, femto cells and other small cells, and to handovers from macro cells to small cells. According to certain aspects of the present invention a base station may attempt to handoff a call associated with a user equipment (UE) by identifying a target small cell based on a primary scrambling code (PSC) and timing offsets between multiple transmissions of the PSC detected by the UE and reported to the base station by the UE.

In an aspect of the disclosure, a method for unique small cell identification comprises receiving a first transmission from a target base station, and receiving a second transmission from the target base station. The transmissions may include a PSC. The second transmission may be a duplicate of the first transmission, which is separately transmitted by the target base station. In an aspect of the disclosure, the method comprises determining a magnitude of a timing offset observed as a delay between arrival of the first transmission and arrival of the second transmission. The combination of the PSC and the magnitude of the timing offset may be used to identify the target base station. The method may comprise transmitting information including the PSC and the timing offset to a source base station.

In an aspect of the disclosure, the method comprises extracting the PSC, which may be accomplished using a coherent combination of the first transmission and the second transmission. At least one of the target base station and the source base station may be associated with a femto cell, a micro cell, or a pico cell. The source base station may be associated with a macro cell. The timing offset may be distinguishable from delays attributable to multipath transmissions. In an aspect of the disclosure, the first transmission and the second transmission may be received in signals that have substantially the same power level. The second transmission may be received in a signal that has a power that is greater than the power of a signal that carries the first transmission.

In an aspect of the disclosure, receiving the second transmission from the target base station may include receiving a plurality of duplicates of the first transmission. Each of the plurality of duplicates of the first transmission may arrive at a different time with respect to the other transmissions. The target base station may be identified based on differences in time of arrival of the first transmission and the plurality of duplicates of the first transmission, and based on a power distribution observed between the first transmission and the plurality of duplicates of the first transmission. Each of the plurality of duplicate transmissions may be carried by a signal that is received with a power level that is the same or greater than power of a received signal that carries the first transmission.

In an aspect of the disclosure, a method of wireless communication comprises transmitting a PSC in a first signal, and transmitting the PSC in a second signal after a first predefined timing offset. The combination of timing offset and PSC may uniquely identify a target base station among a plurality of neighboring base stations. The timing offset may be chosen so as to distinguish from natural multipath scenarios. The timing offset may be selected using a random or pseudo-random number generator. In an aspect of the disclosure, the method comprises transmitting the PSC in a third signal after a second predefined timing offset, which may be different from the first predefined timing offset.

In an aspect of the disclosure, the method comprises allocating an available transmission power between the first and second signals. The first signal and the second signal may be transmitted with substantially the same power level. The second signal may be transmitted with greater power than the first signal.

In an aspect of the disclosure, the method comprises maintaining a mapping of the plurality of neighboring base stations. Each neighboring base station may be mapped to a PSC and a timing offset associated with the each neighboring base station. Each neighboring base station may transmit the PSC in first and second signals separated by the timing offset associated with the each neighboring base station. The timing offset may be selected independently of plurality of neighboring base stations In an aspect of the disclosure, a method of wireless communication comprises receiving a measurement report from a UE at the network, and identifying a target base station based on the PSC and the timing offset. The network report may include a PSC and a timing offset corresponding to a difference in arrival times of two signals carrying a duplicate transmission from which the PSC is decoded. The method may comprise initiating a handover of the UE to the target base station.

DETAILED DESCRIPTION

Figure 1:
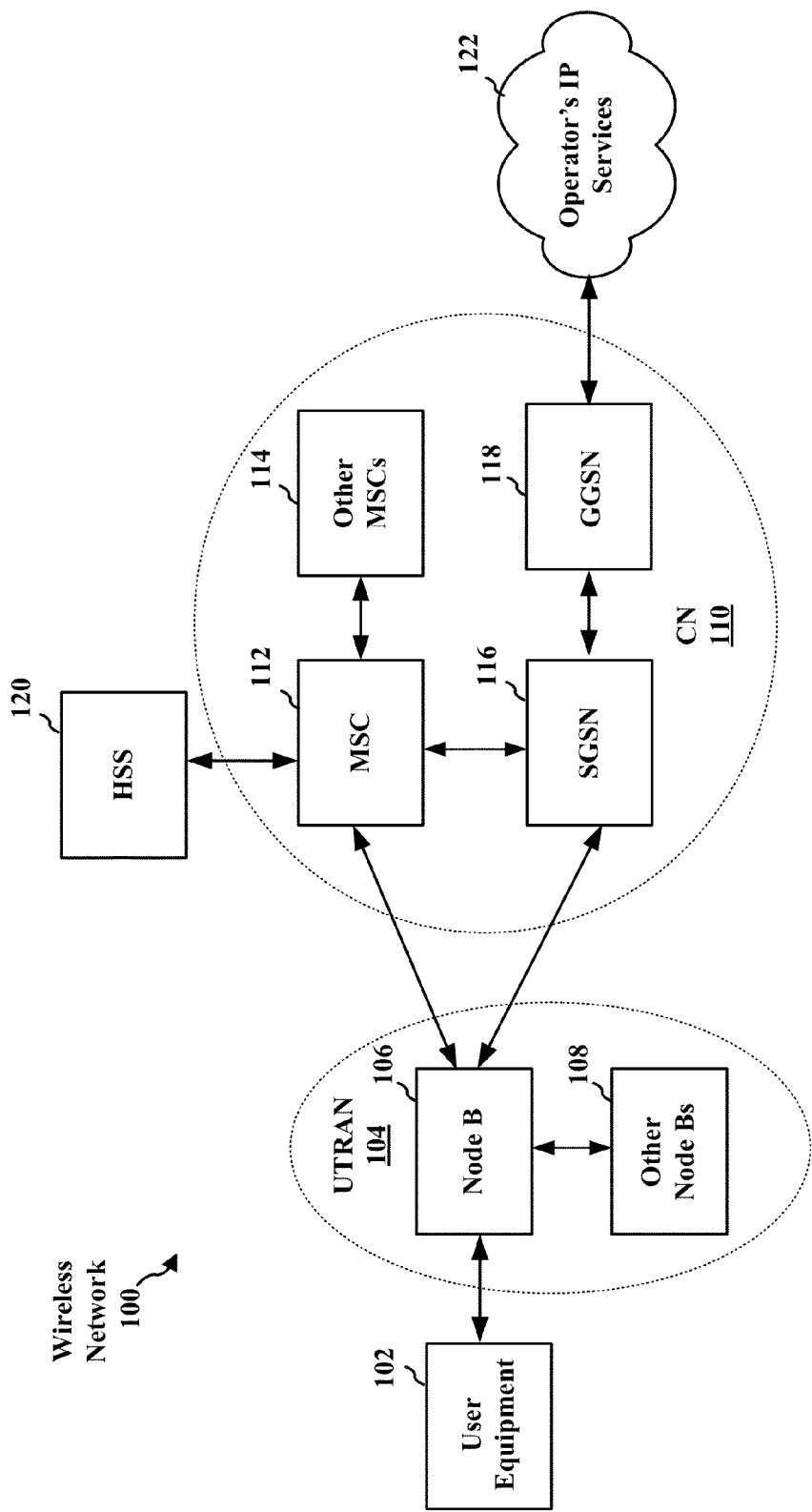
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating one example of a wireless network architecture 100. The illustrated wireless network architecture 100 includes one or more UE 102, a UMTS Terrestrial Radio Access Network (UTRAN) 104, a Core Network (CN) 110, a Home Subscriber Server (HSS) 120, and an Operator's IP Services 122. The wireless network 100 can interconnect with other access networks, but for simplicity those entities/interfaces are not shown. As shown, the wireless network 100 provides packet-switched services, however, as those skilled in the art will readily appreciate, the various concepts presented throughout this disclosure may be extended to networks providing circuit-switched services. Certain aspects of the invention can be applied to other radio access technologies, including LTE networks.

The UTRAN 104 includes Node B 106 and other Node Bs 108. The Node B 106 provides user and control planes protocol terminations toward the UE 102. The Node B 106 may be connected to the other Node Bs 108 via a backhaul (e.g., an X2 interface). The Node B 106 may also be referred to as a base station, a base transceiver station, a radio base station, a radio transceiver, a transceiver function, a basic service set (BSS), an extended service set (ESS), or some other suitable terminology. The Node B 106 provides an access point to the core network 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The Node B 106 is connected to the core network 110. The core network 110 includes a Mobile Switching Center (MSC) 112, other MSCs 114, a Serving GPRS Support Node (SGSN) 116, and a Gateway GPRS Support Node (GGSN) 118. The MSC 112 is the control node that processes the signaling between the UE 102 and the CN 110. Generally, the MSC 112 provides bearer and connection management. All user IP packets are transferred through the SGSN 116, which itself is connected to the GGSN 118. The SGSN 118 provides UE IP address allocation as well as other functions. The SGSN 118 is connected to the Operator's IP Services 122. The Operator's IP Services 122 may include the Internet, an Intranet, an IP Multimedia Subsystem (IMS), and a PS Streaming Service (PSS).

Figure 2:
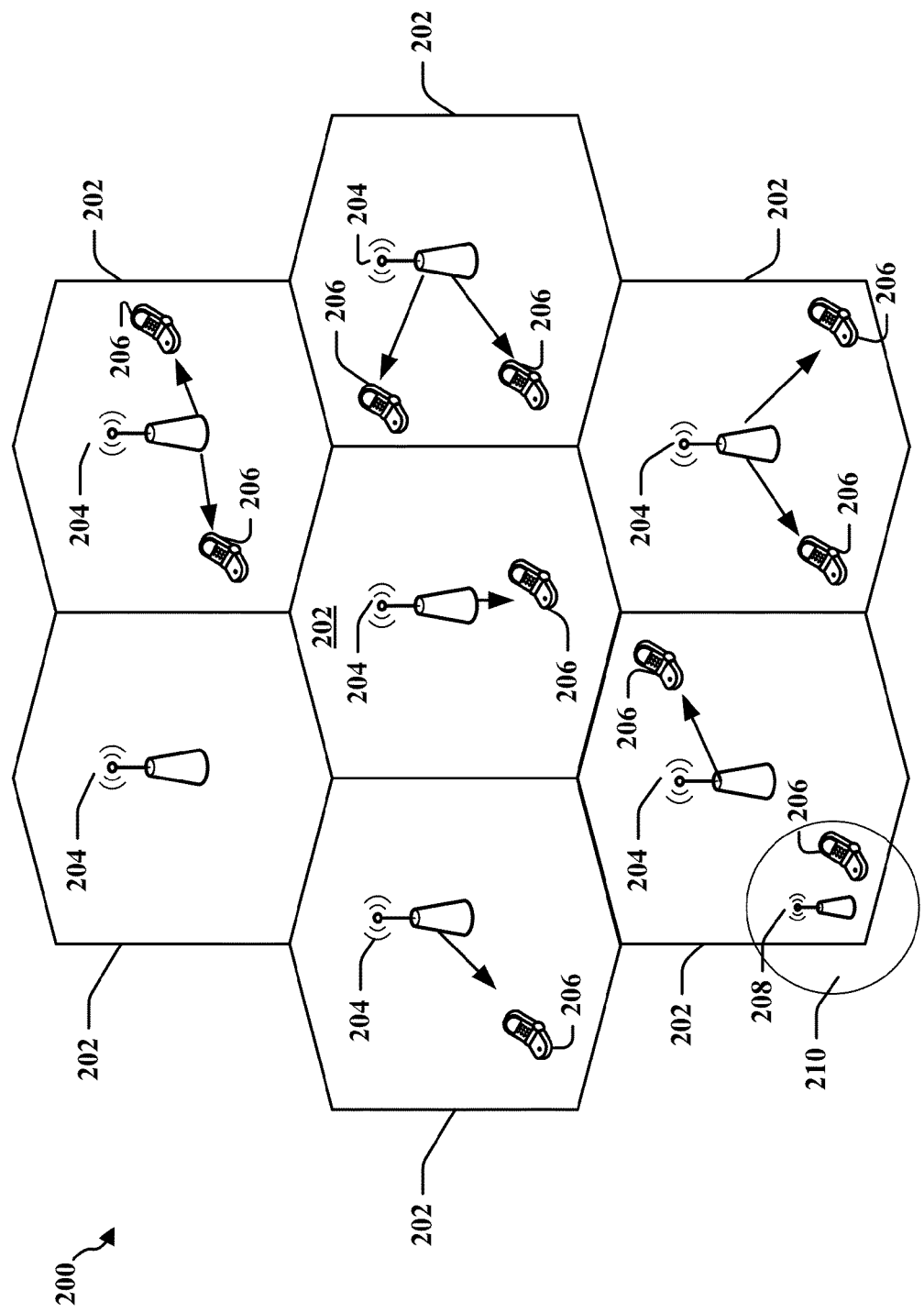
FIG. 2 is a diagram illustrating an example of an access network.

FIG. 2 is a diagram illustrating an example of an access network 200. In this example, the access network 200 is divided into a number of cellular regions (cells) 202. One or more lower power class base stations 208 may have cellular regions 210 that overlap with one or more of the cells 202. Base station 208 may comprise a Node B or, in an LTE network, an evolved Node B (eNB), or another type of base station provided in accordance with the networking technology employed. The lower power class base station 208 may be a femto cell (e.g., home Node B (HNB)), pico cell, micro cell, or remote radio head (RRH). The macro base stations 204 are each assigned to a respective cell 202 and are configured to provide an access point to a core network 110 for all the UEs 206 in the cells 202. There is no centralized controller in this example of an access network 200, but a centralized controller may be used in alternative configurations. Base stations 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In the example of LTE applications, OFDM is used on the downlink (DL) and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 02.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

In some networking technologies, base stations 204 may have multiple antennas supporting multiple-input multiple-output (MIMO) technology. The use of MIMO technology enables the base station 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the base station 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Various aspects of the invention may be applicable to an access network that comprises a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
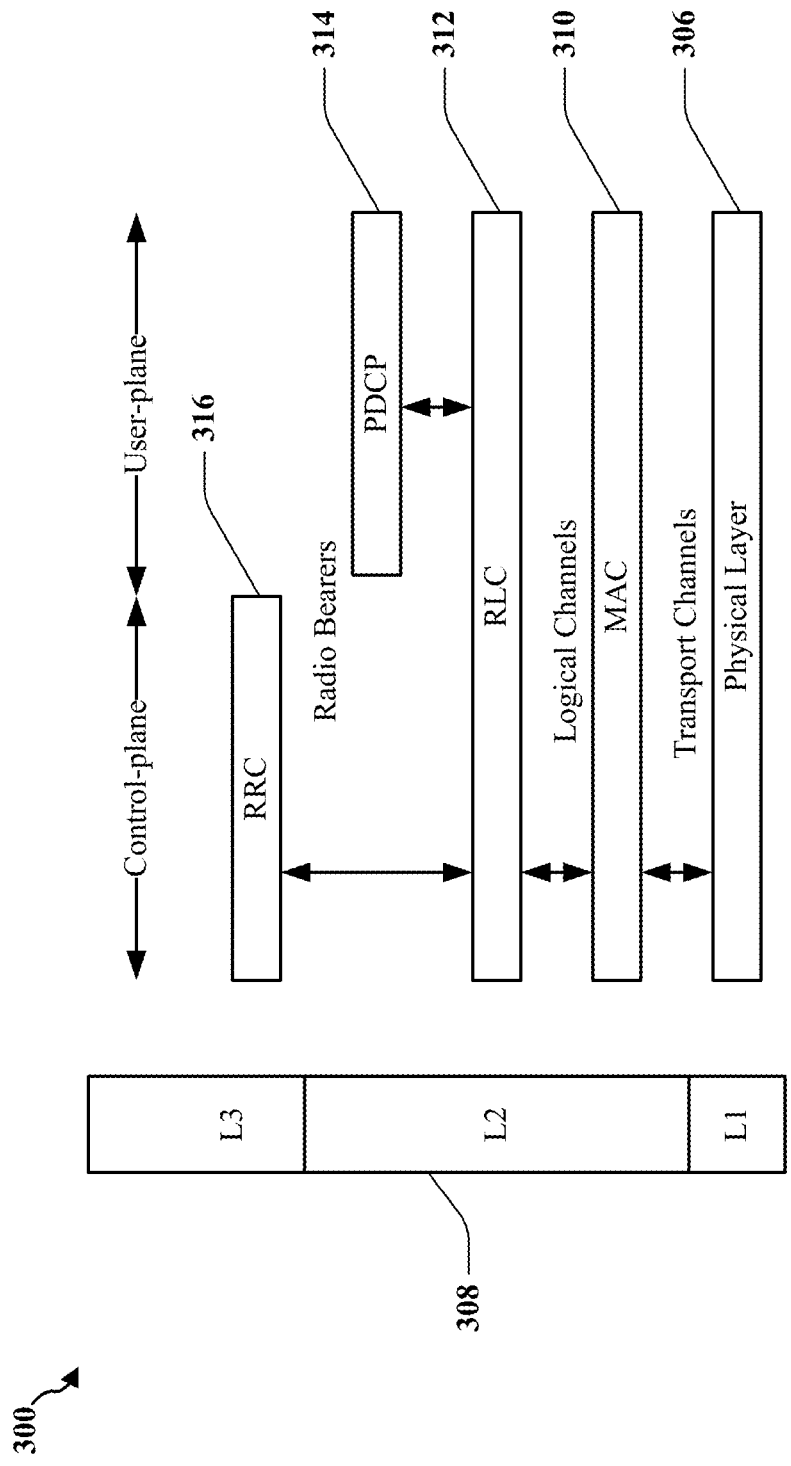
FIG. 3 is a diagram illustrating an example of a radio protocol architecture for the user and control planes.

FIG. 3 is a diagram 300 illustrating a radio protocol architecture for user and control planes in an example using LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNB over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at a base station on the network side. Although not shown, the UE may have several upper layers above the L2 layer 308 including a network layer (e.g., IP layer) that is terminated at the PDN gateway 118 on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between base stations. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control plane, the radio protocol architecture for the UE and base station is substantially the same for the physical layer 306 and the L2 layer 308 with the exception that there is no header compression function for the control plane. The control plane also includes a radio resource control (RRC) sublayer 316 in Layer 3 (L3 layer). The RRC sublayer 316 is responsible for obtaining radio resources (i.e., radio bearers) and for configuring the lower layers using RRC signaling between the base station and the UE.

Figure 4:
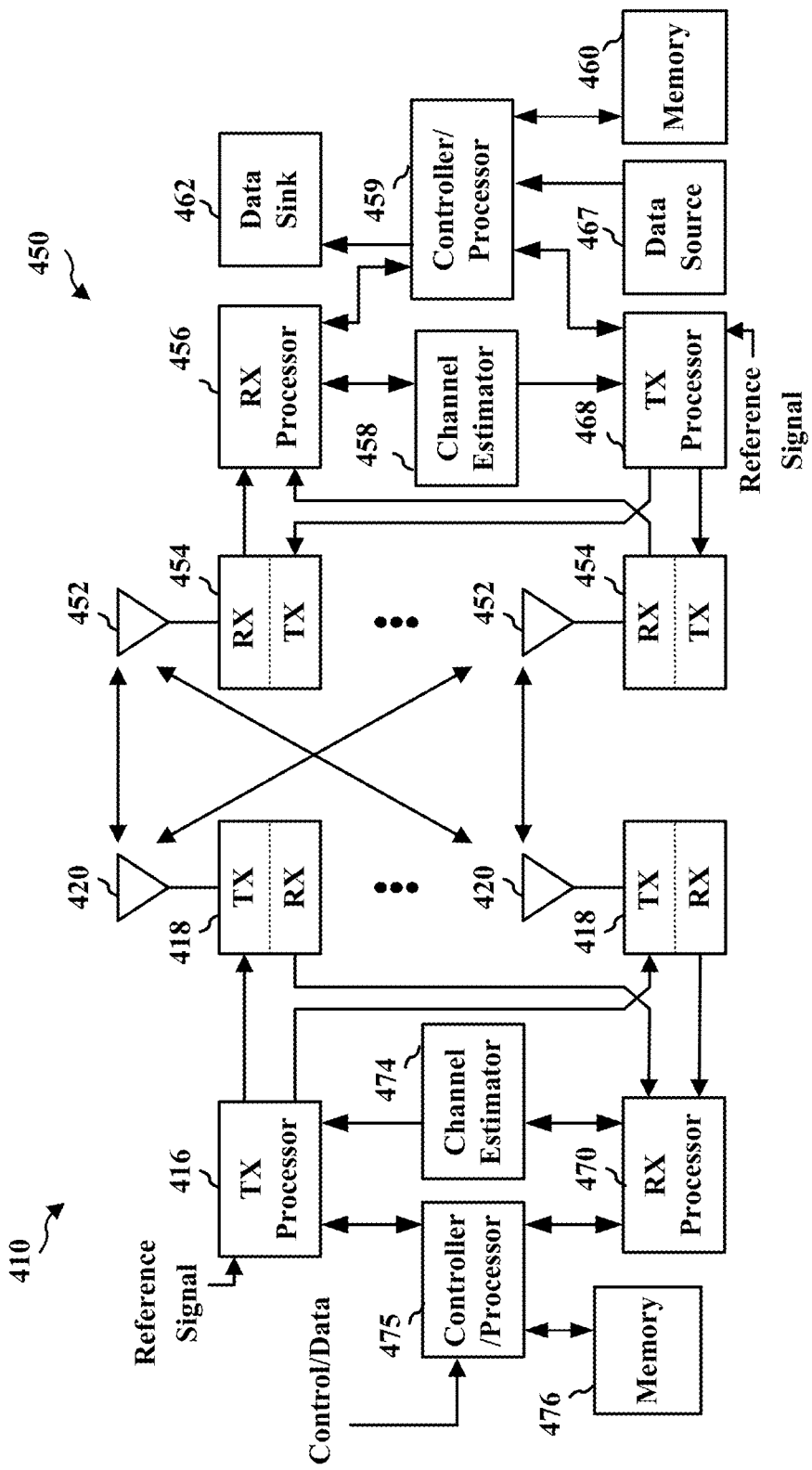
FIG. 4 is a diagram illustrating an example of a base station and user equipment in an access network.

FIG. 4 is a block diagram of a base station 410 in communication with a UE 450 in an access network. Base station 410 may be an eNB or a Node B. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The transmit (TX) processor 416 implements various signal processing functions for the L1 layer (i.e., physical layer). The signal processing functions include coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 performs spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection and, in one example, may use an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the base station 410, the controller/processor 459 implements the L2 layer for the user plane and the control plane by providing header compression, ciphering, packet segmentation and reordering, and multiplexing between logical and transport channels based on radio resource allocations by the base station 410. The controller/processor 459 is also responsible for HARQ operations, retransmission of lost packets, and signaling to the base station 410.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the UE 450. Upper layer packets from the controller/processor 475 may be provided to the core network. The controller/processor 475 is also responsible for error detection and, in one example, may use an ACK and/or NACK protocol to support HARQ operations.

In some wireless networks, issues related to voice and data handovers between micro cells, femto cells and other small cells, and to handovers from macro cells to small cells are becoming increasingly significant as small cells are more widely deployed. In the example of HNBs, which is used herein to illustrate certain novel methods of small cell identification, a macro cell may desire to handover a call associated with a UE to an HNB. In order to execute the handover, the base station may attempt to identify target base stations based on a UE report. Conventionally, the base station may identify a neighboring cell based on a PSC, which is typically transmitted in a common pilot channel. The UE may detect and report one or more detected PSCs to the base station. However, a limited number of PSCs are typically available for HNB use and PSCs may be duplicated among neighboring HNBs within a macro cell. In one example, a carrier may allocate a small number of PSCs for femto cell use from the 512 PSCs defined for a radio access technology. Femto cells, pico cells, and/or microcells may be located in close proximity and the resultant space limitation may cause PSC confusion as multiple small cells in a geographical region are forced to share the same PSC.

Certain embodiments of the invention provide methods for cell identification using multiple transmission of the same PSC with a configurable time offset between the transmissions of the PSC. In some embodiments, the power magnitudes of the transmissions are also configurable. By assigning different offset values for each HNB, a UE may determine and provide sufficient information to distinguish between HNBs that transmit the same PSC, without the need to acquire additional broadcast information such as enhanced or extended cell IDs.

In one example, an HNB or other base station provides multiple transmissions of its PSC. Multiple transmissions may be differentiated from one another by a predefined time offset between transmissions. A UE may detect two or more of the multiple PSC transmissions and the offset or offsets between the transmissions. The UE may also determine relative magnitudes of the transmissions. A conventional receiver detecting two transmissions of Primary Common Pilot Channel (CPICH), for example, may assume that the second transmission is delayed because of the presence of multiple propagation paths, including direct and indirect paths between base station and receiver. A conventional receiver may simply combine multipath transmissions to decode the PSC from the CPICH.

In certain embodiments, the UE may be configured or adapted to use a combination of detected PSC and timing offsets corresponding to multiple received transmissions to uniquely identify a target HNB. The UE may determine that delays and/or power level differences measured between received transmissions are inconsistent with differences induced by different propagation path lengths, and the UE may determine that the received transmissions are encoded with timing offset and/or power level information, which may be used to identify the HNB or base station transmitting the PSC transmissions. In some embodiments, the UE sends one or more detected PSC and timing offset combinations to a current base station, which can use such information to identify the transmitting base station. In some embodiments, the UE may maintain reference information that enables the UE to identify the transmitting base station using timing offsets and power levels corresponding to multiple transmissions of PSC.

In some embodiments, the UE may determine that one or more timing offsets detected between multiple transmissions of PSC may be used to identify a transmitting base station when a delayed PSC transmission is received with substantially the same or greater power than that of a first received PSC transmission. In multipath situations, signals that are delayed because of longer propagation paths between base station and UE typically have lower power than signals received from a more direct propagation path.

In certain embodiments, a transmitting base station may allocate power between the initial PSC transmission and a "delayed" PSC transmission transmitted with a timing offset. The delayed PSC transmission may be sent with increased power relative to the first transmission. The UE may then determine that the delayed transmission has more power than the first received transmission and the UE may recognize that the delay is due to a programmed timing offset. Timing offsets and power levels may be configured to encode additional identification information. In some embodiments, the base station may transmit a plurality of delayed PSC transmissions, each with a different relative power level.

Figure 5:
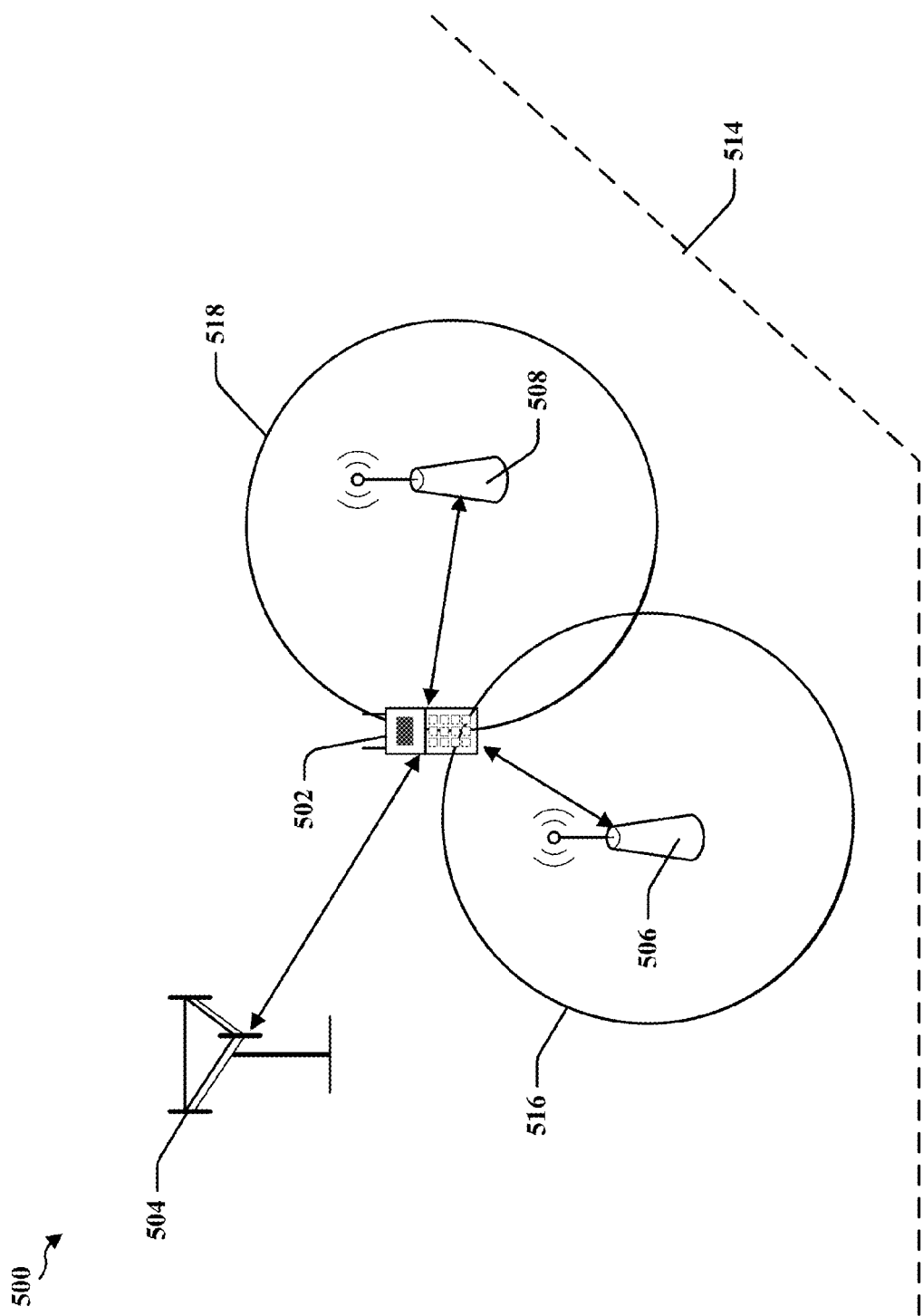
FIG. 5 is a diagram illustrating a macro cell in which HNBs are deployed within the range of the macro cell.

FIG. 5 is a diagram 500 illustrating a range expanded cellular region in a UMTS network. While the drawing is described in terms of UMTS, the general principles are applicable to other network technologies. In the example depicted in FIG. 5, lower power class Node Bs 506 and 508 may deployed within the coverage area 514 of macro Node B 504, providing enhanced, localized bandwidth to UE 502. Lower power class Node Bs 506 and 508 may provide small cell coverage areas 516 and 518, such as a femto cell, a pico cell, a micro cell, and/or an RRH. For ease of description, Node Bs 506 and 508 may be referred to as HNBs 506 and 508, and cells 516 and 518 may be referred to as small cells 516 and 518, although the descriptions are applicable to other types of cells.

Voice and data handovers may occur between pairs of small cells 516 and 518, and between macro cell 514 and small cells 516 and 518. Before a handover of UE 502, the UE 502 typically identifies available cells 514, 516 and 518 that it can detect. In some embodiments, the UE 502 may detect a PSC that identifies one or more small cells 516 and/or 518. For example, macro cell 504 may transmit a PSC as a modulated code of length of 38400 chips and the UE determines the PSC by chip correlation.

PSC space limitation may cause PSC confusion when multiple small cells 516 and 518 proximately located in a geographical region are forced to share the same PSC. Moreover, certain UEs 502 may not provide network reports that include cell identity of the target cell. Accordingly, small cells may not be uniquely identifiable using PSCs.

Accordingly, certain embodiments provide systems and methods that can accommodate unplanned HNB 506 and 508 deployment, even when an insufficient number of PSCs are reserved for HNBs 506 and 508. The systems and methods disclosed herein can provide network operators with adequate PSC to cell 516, 518 identity mapping. A source HNB 506 or 508 may then handover the UE 502 to a target HNB 508 or 506 because cell identity of the target cell 508 or 506 can be readily discerned.

Figure 6:
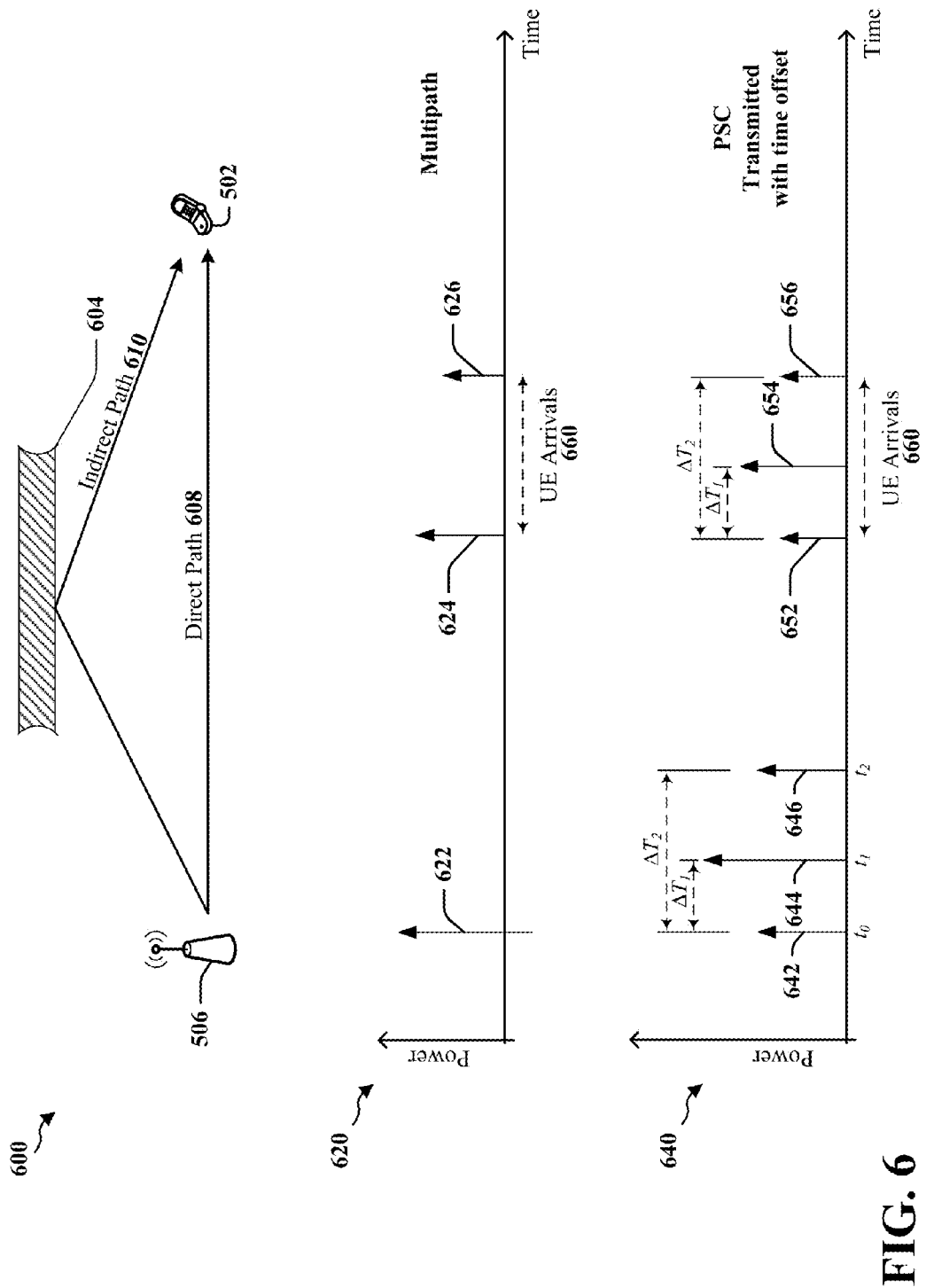
FIG. 6 is a diagram illustrating PSC transmission with time offset for unique small cell identification.
Figure 7:
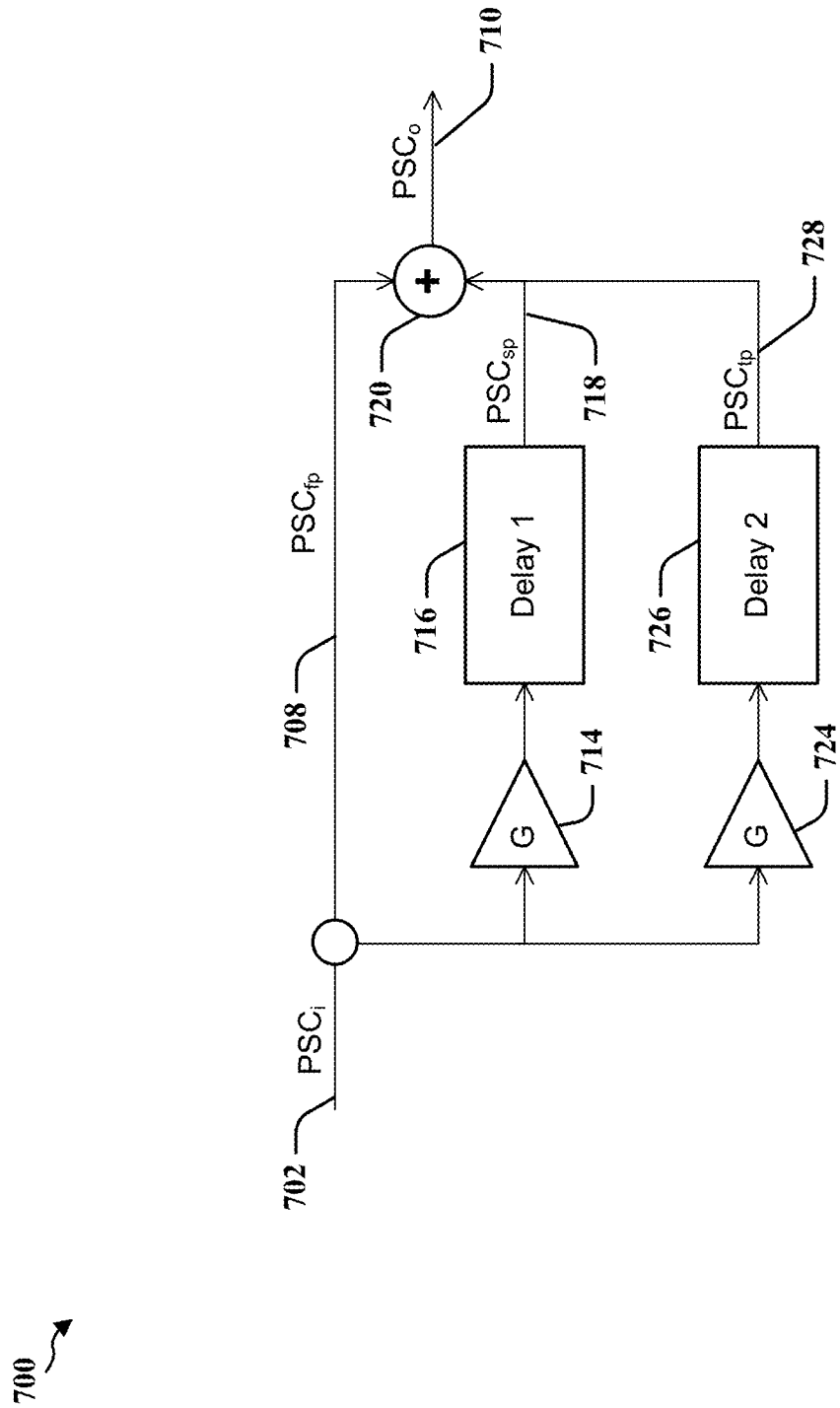
FIG. 7 is a block schematic illustrating generation of a time-offset PSC signals.

With reference also to FIGS. 6 and 7, in certain embodiments, HNB 506 may identify itself by transmitting multiple versions of a signal that includes the PSC of HNB 506, where the transmissions are separated by a predefined time offset. A unique predefined timing offset between PSC transmissions may be associated with each HNB 506 and 508. The timing offsets between transmissions may be selected such that a UE 502 can handle the multiple versions of the signal as multipath transmissions. FIG. 6 illustrates the similarities and differences between multipath delays and the offset transmissions used to communicate HNB 506 identification to UE 502 according to certain aspects of the present invention. Timing chart 620 may be representative of the reception at UE 506 of a multipath signal transmitted at time 622 by HNB 506, wherein the propagation paths 608 and 610 followed by a signal transmitted by base station 506 to UE 502 are shown at 600. As shown generally at 620, the signal transmitted at time 622 travels over a more direct propagation path 608 and arrives at time 624, and also travels over an indirect propagation path 610, arriving at time 626. UE 502 may combine both signals 624 and 626 for signal decoding purposes. Indirect propagation path 610 may include one or more reflections from a building 604 or other object. It can be expected that the power in the signal 626 received from the indirect propagation path 610 will be less than the power in the signal 624 received over the direct propagation path because of the difference in propagation path lengths and/or because of reflection losses.

FIG. 7 illustrates the generation of time-offset PSC transmissions. An input PSC signal, $PSC_i$ 702 may be processed by HNB 506 as first PSC transmission component $PSC_{fp}$ 708. $PSC_i$ 702 may be provided to at least a first gain cell 714 and a first delay unit 716, which may be configured to provide a delayed and amplified or attenuated second PSC transmission component $PSC_{sp}$ 718. $PSC_{fp}$ 708 and $PSC_{sp}$ 718 may be combined, using an adder or other combinational element 720 to produce a combined output $PSC_o$ 710 for transmission to an active UE 502. In some embodiments, multiple time offset components $PSC_{fp}$ 708, $PSC_{sp}$ 718, and $PSC_{tp}$, 728 may be combined in output $PSC_o$ 710. As illustrated in FIG. 7, a second gain cell 724 and delay unit 726 may be used to generate third PSC transmission component $PSC_{tp}$ 728, that is combined by adder 720, but any number of PSC components may be combined.

Delay units 716 and 728 may be configured with delay values that correspond to timing offsets between PSC transmissions. The delay values applied by delay units 716 and 728 may result in a delay $PSC_{tp}$ 728 relative to $PSC_{sp}$ 718 that is the same as or different from the delay between $PSC_{sp}$ 718 and $PSC_{fp}$ 708. Delay values may be configured by a network entity and/or may be selected by HNB 506 independently of other base stations, autonomously and/or arbitrarily. In one example, HNB 506 selects timing offsets using a unique identifier associated with the base station. The unique identifier may be an operator configured identification or other parameter, a MAC address or the like, a serial number, location information, such as a map or GPS coordinate, and so on. In some embodiments, timing offsets may be selected randomly. In one example, a random number generator may be used as a multiplier for calculating the timing offsets. A unique identifier associated with the HNB 506 may be used to generate a seed value for the random number generator. Random number generators can be implemented in hardware, software or any combination of hardware and software a base station signals offset.

Turning again to FIG. 6, and as illustrated in timing chart 640, certain embodiments transmit multiple versions of a PSC transmission in signals 642, 644, and 646. The PSC transmission may include the PSC of HNB 506. The transmissions are separated by one or more predefined time offsets and received signals 652, 654, and 656 may be combined at UE 502 for signal decoding purposes. However, the UE 502 may also identify the sending HNB 506 based on the timing of the received signals 652, 654, and 656. In one example, HNB 506 may be identified based on the relative time difference between signals 652 and 654 and the relative time difference between signals 652 and 656.

In some embodiments, the UE 502 may determine that received signals 652, 654 and 656 include additional HNB identification information when one or more of the later arriving signals 654 and 656 have substantially the same or greater power than the first received signal 652. Identification information can be encoded in the timing and differences in the relative power levels of received signals 652, 654, and 656.

In certain embodiments, HNB identification is not dependent on a reading of broadcast information, such as a cell id, and the methods of HNB identification described herein can be employed in systems that support legacy UEs 502, because legacy UEs will typically treat multiple PSC transmissions as multipath signals. The methods of HNB identification described herein may be applicable to handovers between femto cells 506 and 508, as well as handovers between macro cell 504 and femto cell 506 or 508.

In one example of HNB identification using multiple transmissions of PSC with time offsets, a target HNB 508 or 506 may send a first transmission 642 that includes a pilot signal encoded with a PSC, and one or more subsequent transmissions 644 and 646 of the same pilot signal after predetermined time offset, $\Delta T_n$. Characteristics of the transmissions 642, 644, and 646 are chosen such that UE 502 can distinguish received signals 652, 654 and 656 from multiple signals received in a typical multipath scenario. For example, a later received signal 654 or 656 may have the same or greater power as a previously received signal 652 or 654. Alternatively or additionally, the values of $\Delta T_1$ and $\Delta T_2$ may be chosen so as to differentiate from natural multipath scenarios within cell 514, 516, or 518. Alternatively or additionally, the values of $\Delta T_1$ and $\Delta T_2$ may correspond to propagation paths that would exceed the range of HNB 506 or 508, but that remain within a coherent accumulation window of the receiver in the UE 502.

While operating in the source cell 514, 516 or 518, UE 502 may detect the pilot signal of target HNB 508 or 506 in received signals 652, 654, and 656. The UE 502 may measure the timing offsets between pairs of the received signals 652, 654, and 656 and may provide a decoded PSC and timing offset information to a source Node B 504 or a source HNB 506, or 508 in a measurement report. UE 502 may provide additional information in the measurement report, including power levels of each received copy of the received signals 652, 654, and 656. Offset information may be determined as the difference in absolute arrival times of copies of the received signals 652, 654, and 656. Timing offset information may be calculated by the UE 502 or by the source Node B 514 or source HNB 516 or 518, and the timing offset information may be used to identify the detected target HNB 508 or 506, because different HNBs 506 and 508 that share a common PSC may be configured to use different $\Delta T_n$ values. Each HNB may maintain a mapping of HNB 506, 508 cell identity to (PSC, $\Delta T_n$) values. In some embodiments, a hash function can be used to compute cell identity such that HNB management system (HMS) support is not required and, in Node B 504 to HNB 506 or 508 handover, may avoid additional core network signaling.

In some embodiments, the relative power levels of transmissions 642, 644, and 646 can be configured differently for two or more HNBs 506 and 508 that share a PSC. The HNBs 506 and 508 may map cell identity of HNB 506 and 508 to combinations of time offset and transmission power associated with the delayed copy of the signal. For example, the mapping may identify HNBs 506 and 508 based on tabulated (PSC, $\Delta T_n$, Power) entries.

In some embodiments, the power available to transmit a pilot signal may be divided among the multiple copies of the pilot signal 642, 644, and 646. The received versions of the pilot signal 652, 654, and 656 may be combined at the receiving UE 502, together with true multipath versions of the pilot signals. By allocating greater or equal power to later transmitted copies of the pilot signal 644 or 646, the receiver may identify a later received version of the pilot signal 654 and 656 as a dominant path, and thereby distinguish the received signal copies from typical multipath signals, where first path is typically dominant. Accordingly, one or more of HNBs 506 and 508 may be identified based on time of arrival of received versions of the pilot signal 652, 654, and 656 and a power distribution observable in the received versions of the pilot signal 652, 654, and 656.

Allocating power between the multiple copies of the pilot signal 642, 644, and 646 allows the presently disclosed HNB identification methods to operate without increased power consumption because the total received power for copied pilot signals can be expected to be the same as the power of a pilot signal that is not transmitted repetitively. The use of multiple copies of the pilot signal 642, 644, and 646 does not cause pilot pollution or interference, because UEs 502 typically process received signals in the frequency domain and can combine delayed versions of the pilot signal, whether delays are introduced by multiple offset transmissions of the pilot signal or by multipath effects.

In some embodiments, time offset PSC transmission may be suppressed if no active UE 502 is present. The presence of a UE 502 may be determined based on received signal strength indicator (RSSI). When an active UE 502 is not sensed, multi-path PSC transmission may not be needed and may be suppressed.

Figure 8:
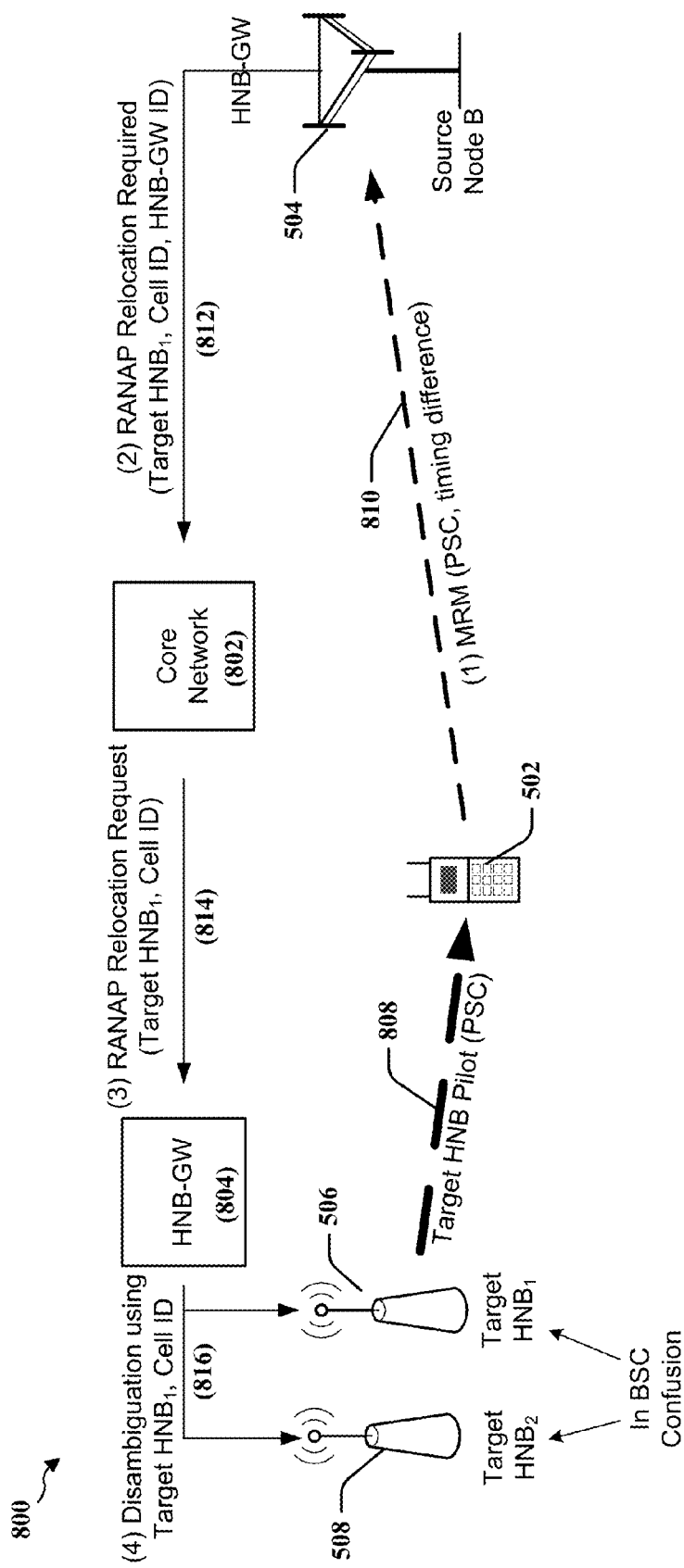
FIG. 8 is a diagram illustrating PSC transmission with time offset for unique small cell identification.

FIG. 8 depicts a simplified call flow for a handover of UE 502 from source base station 504 to HNB 506 or 508. If each of Node B 504, and HNBs 506 and 508 have unique PSCs, then PSC confusion may be avoided and the target HNB can be determined directly from a pilot signal for use in disambiguation. When two or more HNBs 506, 508 (and/or Node B 504) share a PSC, then the UE 502 may provide a measurement report message (MRM) 810 that includes a decoded PSC, timing differences observed between transmissions of the PSC and, in at least some embodiments, power levels of received copies (808) of the pilot signal. The source Node B 504 may determine the identity of the target HNB 506 or 508 and may send a radio access network application part (RANAP) message 812 to the core network 802. The message sent to the core network 802 may comprise one or more of a target HNB identifier, a cell ID and a HNB gateway (HNB-GW) identifier. Using the HNB gateway identifier, the core network 802 may send a RANAP message at 814 to HNB-GW 804, the message including the target HNB identifier and cell ID. The HNB-GW 804 may use the target HNB identifier and cell ID for disambiguation of HNBs 506 and 508 and may cause the appropriate HNB 506 or 508 to execute a handover at 816.

Figure 9:
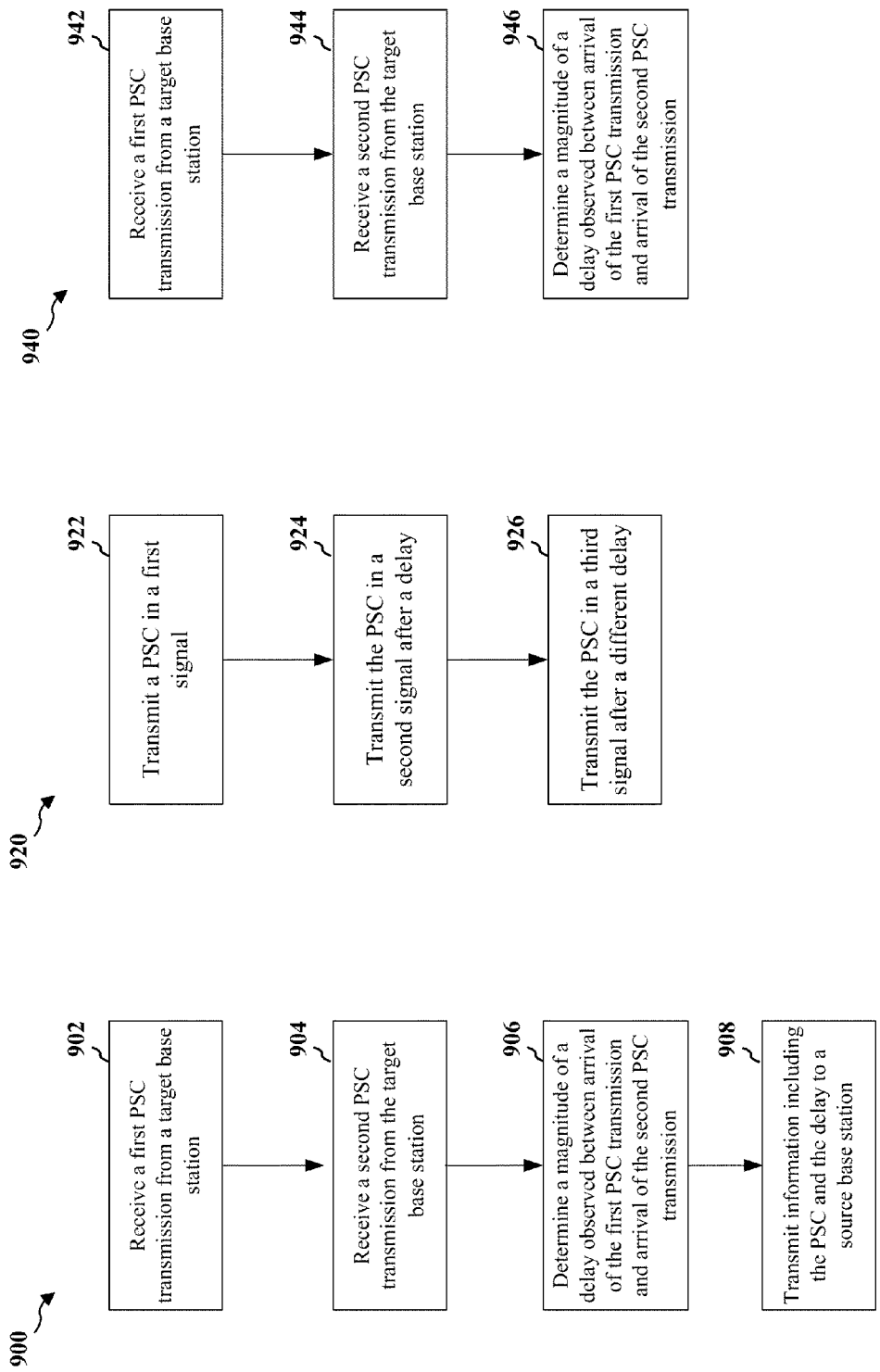
FIG. 9 includes flow charts illustrating methods of wireless communication.

FIG. 9 includes a flow chart 900 of a method of wireless communication. The method may be performed by a UE 502. At step 902, the UE 502 may receive a first PSC transmission from a target base station 504, 506 or 508. The first PSC transmission may include a PSC.

At step 904, the UE 502 may receive a second PSC transmission from the target base station 504, 506 or 508. The second PSC transmission may be a duplicate of the first PSC transmission and may be separately transmitted by the target base station 504, 506, or 508.

At step 906, the UE may determine a magnitude of a timing offset observed as a delay between arrival of the first PSC transmission and arrival of the second PSC transmission. The timing offset may be distinguishable from delays attributable to multipath transmissions.

At step 908, the UE 502 may transmit information including the PSC and the timing offset to a source base station 504, 506, or 508. The combination of the PSC and the magnitude of the timing offset may identify the target base station 504, 506, or 508. The target base station may be identified using a mapping between the PSC and the magnitude of the timing offset. The mapping may be maintained by one or more base stations.

In some embodiments, the UE 502 extracts the PSC using coherent combination of the first PSC transmission and the second PSC transmission. At least one of the target base station 504, 506, or 508 and the source base station 504, 506, or 508 may be associated with a femto cell, a micro cell, or a pico cell. The source base station 504, 506, or 508 may be associated with a macro cell. The timing offset may be chosen so as to differentiate from natural multipath scenarios. The first PSC transmission and the second PSC transmission may be received in signals that have substantially the same power level. The second PSC transmission may be received in a signal that has a power that is greater than the power of a signal that carries the first PSC transmission.

In some embodiments, receiving the second PSC transmission from the target base station may include receiving a plurality of duplicates of the first PSC transmission. Each of the plurality of duplicates of the first PSC transmission may arrive at a different time. Each of the plurality of duplicate PSC transmissions may be carried by a signal that is received with a power level that is the same or greater than power of a received signal that carries the first PSC transmission. The target base station may be identified based on differences in time of arrival of the first transmission and the plurality of duplicates of the first transmission, and a power distribution observed between the first transmission and the plurality of duplicates of the first transmission.

FIG. 9 includes a flow chart 920 of a method of wireless communication. The method may be performed by a base station 504, 506, 508, which may be associated with a macro cell, a femto cell, a micro cell, or a pico cell. At step 922, the base station 504, 506, 508 may transmit a primary scrambling code (PSC) in a first signal.

At step 924, the base station 504, 506, 508 may transmit the PSC in a second signal after a timing offset. The combination of timing offset and PSC may uniquely identify a target base station 504, 506, 508 among a plurality of neighboring base stations. The timing offset may be a fraction of the time taken to transmit the PSC.

In some embodiments, the base station 504, 506, 508 transmits (step 926) the PSC in a third signal after a different timing offset which may be a different fraction of the time taken to transmit the PSC.

In some embodiments, the base station 504, 506, 508 allocates an available transmission power between the first and second signals. The first signal and the second signal may be transmitted with substantially the same power level. The second signal may be transmitted with greater power than the first signal.

In some embodiments, the base station 504, 506, 508 maintains a mapping of the plurality of neighboring base stations. Each neighboring base station may be mapped to a PSC and a timing offset associated with the each neighboring base station. The each neighboring base station may transmit the PSC in first and second signals separated by the timing offset associated with the each neighboring base station. The timing offset may be independently selected by each of the plurality of neighboring base stations. For example, timing offsets may be selected using a unique identifier of the base station, such as a configured identification, a MAC address or the like, a serial number, location information, such as a map or GPS coordinate, and so on. In some embodiments, timing offsets may be selected randomly. In one example, a random number generator may be used as a seed value to select the timing offsets. Random number generators can be implemented in hardware, software or any combination of hardware and software.

FIG. 9 includes a flow chart 940 of a method of wireless communication. The method may be performed by a base station 504, 506, 508, which may be associated with a macro cell, a femto cell, a micro cell, or a pico cell. At step 942, the base station 504, 506, 508 may receive a measurement report from a UE 502, the measurement report including a PSC and a timing offset corresponding to a difference in arrival times of two signals carrying a duplicate PSC transmission from which the identity of the target base station is determined.

At step 942, the base station 504, 506, 508 may identify a target base station based on the PSC and the timing offset.

At step 942, the base station 504, 506, 508 may initiate a handover of the UE to the target base station 504, 506, 508.

Figure 10:
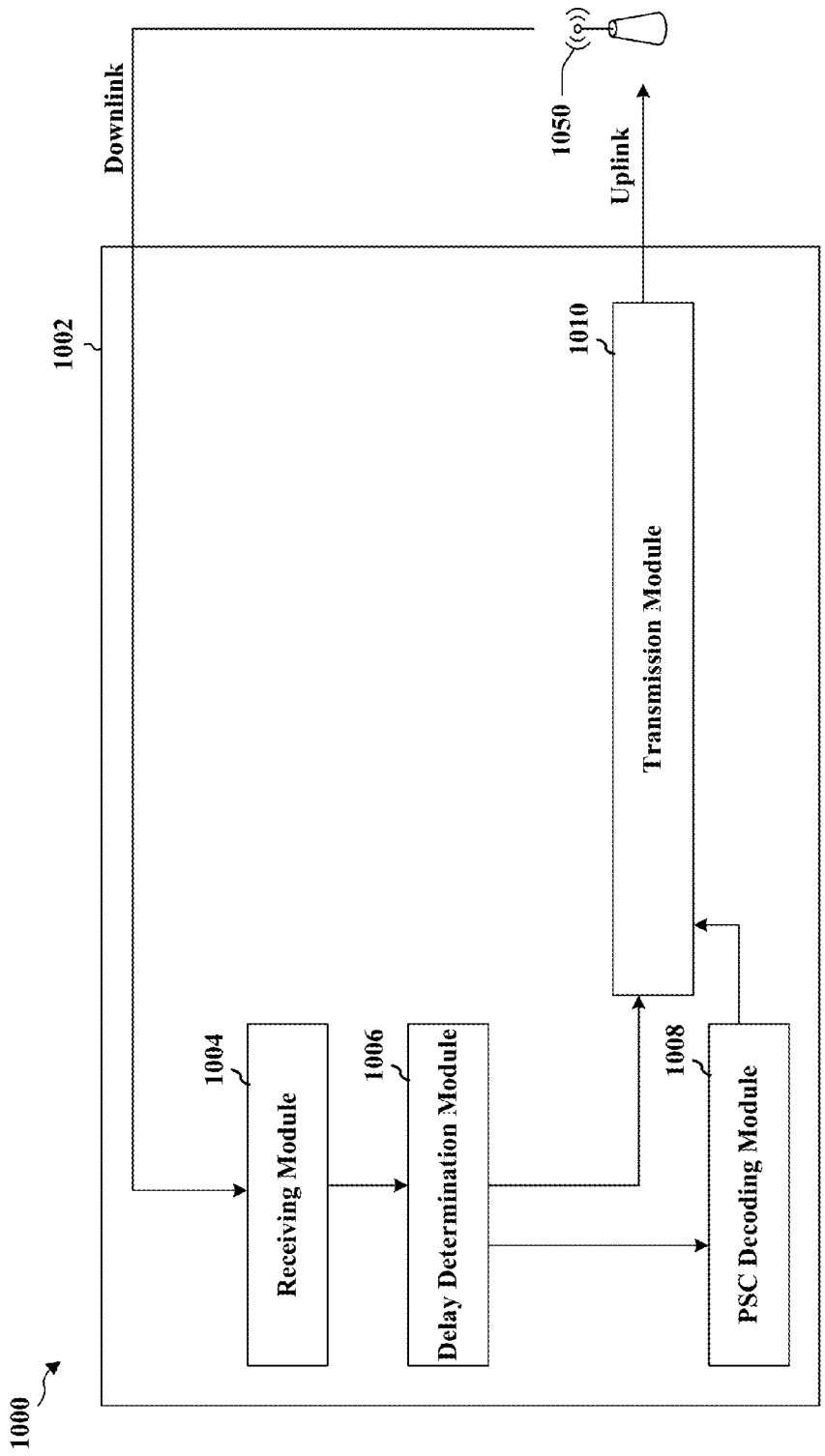
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE 502. The apparatus includes a module 1004 that receives multiple copies of a PSC transmission, a module 1006 that determines a timing offset based on differences in arrival times of the multiple copies of the PSC transmission, a module 1008 that extracts a PSC from the multiple copies of the PSC transmission, and a module 1010 that transmits information including the timing offset and the PSC.

The apparatus may include additional modules that perform each of the steps of the algorithm in the aforementioned flow charts of FIG. 9. As such, each step in the aforementioned flow charts of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
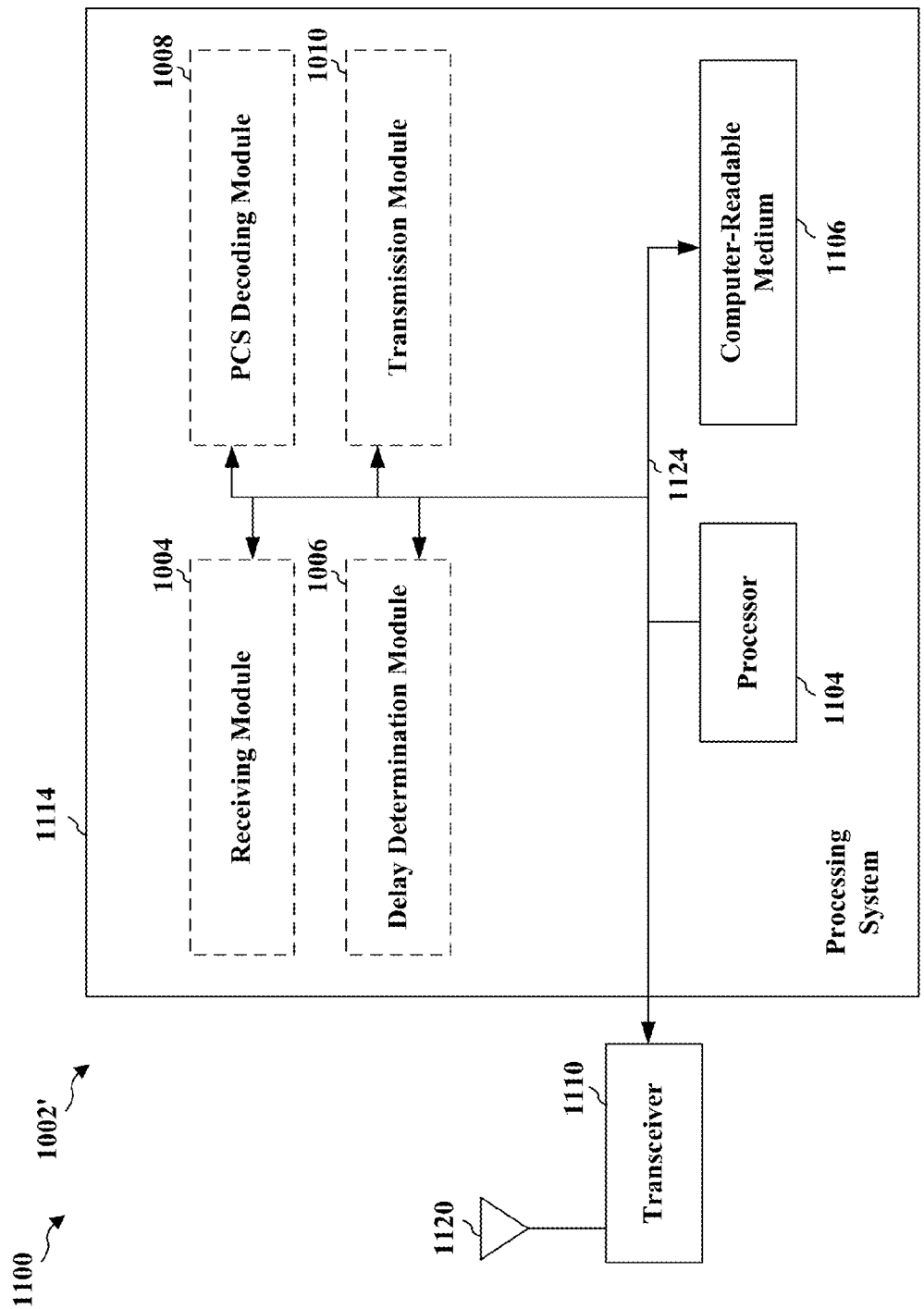
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, and 1010. The modules may be software modules running in the processor 1104, resident/stored in the computer readable medium 1106, one or more hardware modules coupled to the processor 1104, or some combination thereof. The processing system 1114 may be a component of the UE 450 and may include the memory 460 and/or at least one of the TX processor 468, the RX processor 456, and the controller/processor 459.

In one configuration, the apparatus 1002/1002' for wireless communication includes means 1004 for receiving a first PSC transmission from a target base station, means 1004 for receiving a second PSC transmission from the target base station, means 1006 for determining a magnitude of a timing offset observed between arrival of the first PSC transmission and arrival of the second PSC transmission, means 1008 for extracting the PSC from the PSC transmissions, and means 1010 for transmitting information including the PSC and the timing offset to a source base station.

Figure 12:
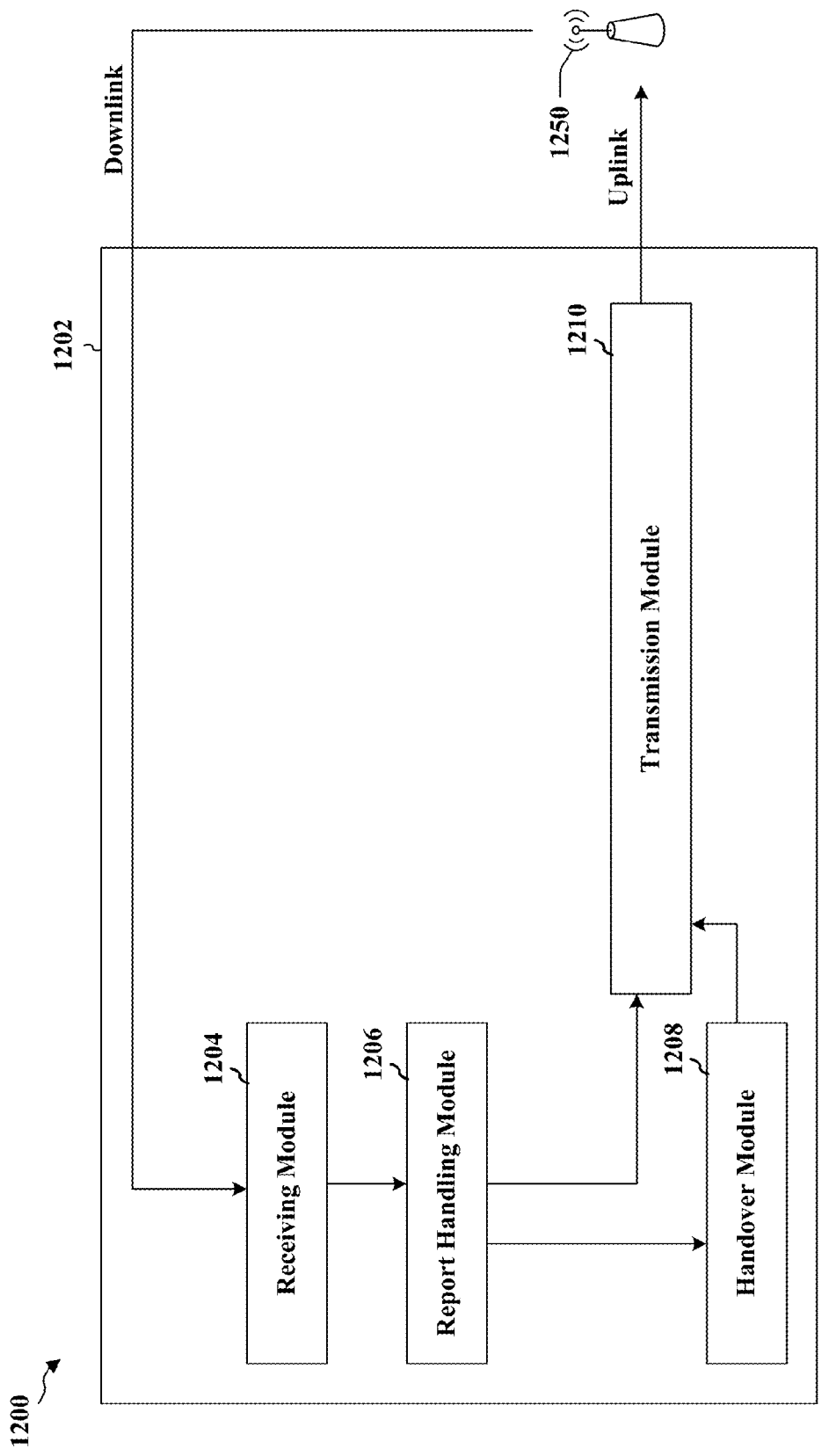
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a base station 504 or HNB 506, 508 (commonly, base station). The apparatus includes a module 1204 that receives information including network reports from a UE 502, a module 1206 that analyzes the reports and identifies base stations based on PSC and timing offset information, a module 1208 that initiates and/or performs a handover of UE 502, and a module 1204 that transmits information including PSCs in multiple copies of a PSC transmission.

The apparatus may include additional modules that perform each of the steps of the algorithm in the aforementioned flow charts of FIG. 9. As such, each step in the aforementioned flow charts of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
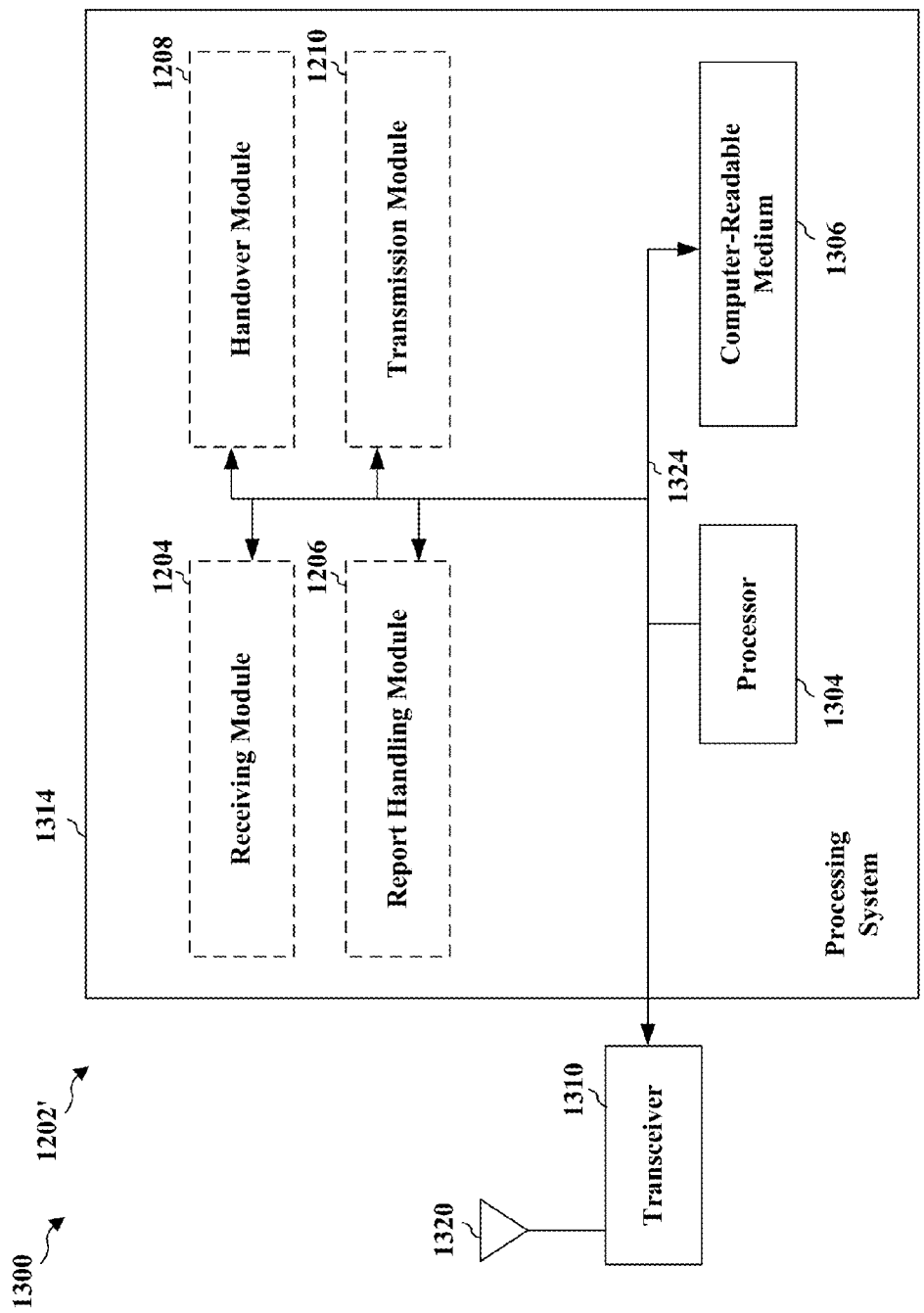
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, and 1210. The modules may be software modules running in the processor 1304, resident/stored in the computer readable medium 1306, one or more hardware modules coupled to the processor 1304, or some combination thereof. The processing system 1314 may be a component of the base station 410 and may include the memory 476 and/or at least one of the TX processor 416, the RX processor 470, and the controller/processor 475.

In one configuration, the apparatus 1202/1202' for wireless communication includes means 1210 for transmitting a PSC in one or more signals, means 1204 for receiving a network report from a UE, the network report including a PSC and a timing offset corresponding to a difference in arrival times of two signals carrying a duplicate PSC transmission, means 1206 for identifying a target base station based on the PSC and the timing offset, and means 1208 for initiating or handling a handover of the UE to the target base station.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    receiving a first transmission from a target base station, wherein the first transmission includes a primary scrambling code (PSC);
    receiving a second transmission from the target base station, wherein the second transmission is a duplicate of the first transmission and is separately transmitted by the target base station;
    determining a magnitude of a timing offset observed as a delay between arrival of the first transmission and arrival of the second transmission; and
    transmitting information including the PSC and the timing offset to a source base station, wherein the combination of the PSC and the magnitude of the timing offset identifies the target base station.

2. The method of claim 1, further comprising extracting the PSC using a coherent combination of the first transmission and the second transmission.

3. The method of claim 1, wherein at least one of the target base station and the source base station is associated with a femto cell, a micro cell, or a pico cell.

4. The method of claim 3, wherein the source base station is associated with a macro cell.

5. The method of claim 1, wherein the timing offset is distinguishable from delays attributable to multipath transmissions.

6. The method of claim 1, wherein the first transmission and the second transmission are received in signals that have substantially the same power level.

7. The method of claim 1, wherein the second transmission is received in a signal that has a power that is greater than the power of a signal that carries the first transmission.

8. The method of claim 1, wherein receiving the second transmission from the target base station includes receiving a plurality of duplicates of the first transmission, wherein each of the plurality of duplicates of the first transmission arrives at a different time.

9. The method of claim 8, wherein the target base station is identified based on differences in time of arrival of the first transmission and the plurality of duplicates of the first transmission, and based on a power distribution observed between the first transmission and the plurality of duplicates of the first transmission.

10. The method of claim 8, wherein each of the plurality of duplicates of the first transmission is carried by a signal that is received with a power level that is the same or greater than power of a received signal that carries the first transmission.

11. The method of claim 1, wherein the target base station is identified using a mapping between the PSC and the magnitude of the timing offset, and wherein the mapping is maintained by one or more base stations.

12. An apparatus for wireless communication, comprising:
    means for receiving a first transmission from a target base station, wherein the first transmission includes a primary scrambling code (PSC);
    means for receiving a second transmission from the target base station, wherein the second transmission is a duplicate of the first transmission and is separately transmitted by the target base station;
    means for determining a magnitude of a timing offset observed between arrival of the first transmission and arrival of the second transmission; and
    means for transmitting information including the PSC and the timing offset to a source base station, wherein the combination of the PSC and the magnitude of the timing offset identifies the target base station.

13. The apparatus of claim 12, further comprising means for extracting the PSC using a coherent combination of the first transmission and the second transmission.

14. The apparatus of claim 12, wherein at least one of the target base station and the source base station is associated with a femto cell, a micro cell, or a pico cell.

15. The apparatus of claim 14, wherein the source base station is associated with a macro cell.

16. The apparatus of claim 12, wherein the timing offset is distinguishable from delays attributable to multipath transmissions.

17. The apparatus of claim 12, wherein the first transmission and the second transmission are received in signals that have substantially the same power level.

18. The apparatus of claim 12, wherein the second transmission is received in a signal that has a power that is greater than a signal that carries the first transmission.

19. The apparatus of claim 12, wherein the means for receiving the second transmission from the target base station receives a plurality of duplicates of the first transmission, wherein each of the plurality of duplicates of the first transmission arrives at a different time.

20. The apparatus of claim 19, wherein the target base station is identified based on time of arrival of the first transmission and the plurality of duplicates of the first transmission and a power distribution observed between the first transmission and the plurality of duplicates of the first transmission.

21. The apparatus of claim 19, wherein each of the plurality of duplicates of the first transmission is carried by a signal that is received with a power level that is the same or greater than power of a received signal that carries the first transmission.

22. The apparatus of claim 12, wherein the target base station is identified using a mapping between the PSC and the magnitude of the timing offset, and wherein the mapping is maintained by one or more base stations.

23. An apparatus for wireless communication, comprising:
a processing system configured to:
receive a first transmission from a target base station, wherein the first transmission includes a primary scrambling code (PSC);
receive a second transmission from the target base station, wherein the second transmission is a duplicate of the first transmission and is separately transmitted by the target base station;
determine a magnitude of a timing offset observed between arrival of the first transmission and arrival of the second transmission; and
transmit information including the PSC and the timing offset to a source base station, wherein the combination of the PSC and the magnitude of the timing offset identifies the target base station.

24. The apparatus of claim 23, wherein at least one of the target base station and the source base station is associated with a femto cell, a micro cell, or a pico cell.

25. The apparatus of claim 24, wherein the source base station is associated with a macro cell.

26. The apparatus of claim 23, wherein the timing offset is distinguishable from delays attributable to multipath transmissions.

27. The apparatus of claim 23, wherein the second transmission is received in a signal that has a power that is substantially the same or greater than the power of a signal that carries the first transmission.

28. A computer program product, comprising:
a non-transitory computer-readable medium comprising code for:
receiving a first transmission from a target base station, wherein the first transmission includes a primary scrambling code (PSC);
receiving a second transmission from the target base station, wherein the second transmission is a duplicate of the first transmission and is separately transmitted by the target base station;
determining a magnitude of a timing offset observed between arrival of the first transmission and arrival of the second transmission; and
transmitting information including the PSC and the timing offset to a source base station, wherein the combination of the PSC and the magnitude of the timing offset identifies the target base station.

29. The computer program product of claim 28, wherein at least one of the target base station and the source base station is associated with a femto cell, a micro cell, or a pico cell.

30. The computer program product of claim 29, wherein the source base station is associated with a macro cell.

31. The computer program product of claim 28, wherein the timing offset is distinguishable from delays attributable to multipath transmissions.

32. The computer program product of claim 28, wherein the second transmission is received in a signal that has a power that is substantially the same or greater than the power of a signal that carries the first transmission.

33. A method of wireless communication, comprising:
transmitting a primary scrambling code (PSC) in a first signal; and
transmitting the PSC in a second signal after a timing offset, wherein the combination of timing offset and PSC uniquely identifies a target base station among a plurality of neighboring base stations.

34. The method of claim 33, further comprising selecting the timing offset using a random or pseudo-random number generator.

35. The method of claim 33, further comprising transmitting the PSC in a third signal after a different timing offset.

36. The method of claim 33, wherein transmitting the PSC in a second signal comprises transmitting the PSC in one or more additional signals, each signal being transmitted after a different timing offset, and further comprising allocating an available transmission power between the first signal and the one or more additional signals.

37. The method of claim 36, wherein the first signal and at least one of the one or more additional signals are transmitted with substantially the same power level.

38. The method of claim 36, wherein at least one of the one or more additional signals is transmitted with greater power than the first signal.

39. The method of claim 33, further comprising maintaining a mapping of the plurality of neighboring base stations, wherein each neighboring base station is mapped to a PSC and a timing offset associated with the each neighboring base station.

40. The method of claim 39, wherein the each neighboring base station transmits the PSC in first and second signals separated by the timing offset associated with the each neighboring base station.

41. The method of claim 39, further comprising selecting the timing offset independently of plurality of neighboring base stations.

42. The method of claim 39, further comprising determining whether a user equipment is present, wherein the PSC is transmitted in the second signal only when the user equipment is present.

43. An apparatus for wireless communication, comprising:
means for transmitting a primary scrambling code (PSC) in a first signal; and
means for transmitting the PSC in a second signal after a timing offset, wherein the combination of delay and PSC uniquely identifies a target base station among a plurality of neighboring base stations.

44. The apparatus of claim 43, wherein the timing offset is selected using a random or pseudo-random number generator.

45. The apparatus of claim 44, further comprising means for transmitting the PSC in a third signal after a different timing offset.

46. The apparatus of claim 43, wherein the means for transmitting the PSC in a second signal transmits the PSC in one or more additional signals, each signal being transmitted after a different timing offset, and further comprising means for allocating an available transmission power between the first signal and the one or more additional signals.

47. The apparatus of claim 46, wherein the first signal and at least one of the one or more additional signals are transmitted with substantially the same power level.

48. The apparatus of claim 46, wherein at least one of the one or more additional signals is transmitted with greater power than the first signal.

49. The apparatus of claim 43, further comprising means for maintaining a mapping of the plurality of neighboring base stations, wherein each neighboring base station is mapped to a PSC and a timing offset associated with the each neighboring base station.

50. The apparatus of claim 49, wherein the each neighboring base station transmits the PSC in first and second signals separated by the timing offset associated with the each neighboring base station.

51. The apparatus of claim 49, further comprising means for selecting the timing offset independently of plurality of neighboring base stations.

52. The apparatus of claim 43, wherein the PSC is transmitted in the second signal only when a user equipment is determined to be present.

53. An apparatus for wireless communication, comprising:
a processing system configured to:
transmit a primary scrambling code (PSC) in a first signal; and
transmit the PSC in a second signal after a timing offset, wherein the combination of timing offset and PSC uniquely identifies a target base station among a plurality of neighboring base stations.

54. The apparatus of claim 53, wherein the processing system is configured to select the timing offset using a random or pseudo-random number generator.

55. The apparatus of claim 53, wherein the processing system is further configured to allocate an available transmission power between the first and at least one additional signal, wherein the at least one additional signal and the first signal are transmitted with substantially equal or greater power.

56. The apparatus of claim 53, wherein the processing system is further configured to maintain a mapping of the plurality of neighboring base stations, wherein each neighboring base station is mapped to a PSC and a timing offset associated with the each neighboring base station, and wherein the each neighboring base station transmits the PSC in first and second signals separated by the timing offset associated with the each neighboring base station.

57. A non-transitory computer program product, comprising:
a non-transitory computer-readable medium comprising code for:
transmitting a primary scrambling code (PSC) in a first signal; and
transmitting the PSC in a second signal after a timing offset, wherein the combination of timing offset and PSC uniquely identifies a target base station among a plurality of neighboring base stations.

58. The computer program product of claim 57, wherein the computer-readable medium comprises code for selecting the timing offset using a random or pseudo-random number generator.

59. The computer program product of claim 57, wherein the computer-readable medium comprises code for allocating an available transmission power between the first and at least one additional signal, wherein the at least one additional signal and the first signal are transmitted with substantially equal or greater power.

60. The computer program product of claim 57, wherein the computer-readable medium comprises code for maintaining a mapping of the plurality of neighboring base stations, wherein each neighboring base station is mapped to a PSC and a timing offset associated with the each neighboring base station, and wherein the each neighboring base station transmits the PSC in first and second signals separated by the timing offset associated with the each neighboring base station.

61. A method of wireless communication, comprising:
receiving a measurement report from a user equipment (UE), the measurement report including a primary scrambling code (PSC) and a delay corresponding to a difference in arrival times of two signals carrying a duplicate transmission from which the PSC is decoded; and
identifying a target base station based on a combination of the PSC and the delay.

62. The method of claim 61, further comprising initiating a handover of the UE to the target base station.

63. A wireless communication apparatus, comprising:
means for receiving a measurement report from a user equipment (UE), the measurement report including a primary scrambling code (PSC) and a delay corresponding to a difference in arrival times of two signals carrying a duplicate transmission from which the PSC is decoded; and
means for identifying a target base station based on a combination of the PSC and the delay.

64. The wireless communication apparatus of claim 63, further comprising means for initiating a handover of the UE to the target base station.

65. An apparatus for wireless communication, comprising:
a processing system configured to:
receive a measurement report from a user equipment (UE), the measurement report including a primary scrambling code (PSC) and a delay corresponding to a difference in arrival times of two signals carrying a duplicate transmission from which the PSC is decoded;
identify a target base station based on a combination of the PSC and the delay; and
initiate a handover of the UE to the target base station.

66. A non-transitory computer program product, comprising:
a non-transitory computer-readable medium comprising code for:
receiving a measurement report from a user equipment (UE), the measurement report including a primary scrambling code (PSC) and a delay corresponding to a difference in arrival times of two signals carrying a duplicate transmission from which the PSC is decoded;
identifying a target base station based on a combination of the PSC and the delay; and
initiate a handover of the UE to the target base station.

* * * * *